Oct. 6, 1964  L. F. SHAW ETAL  3,151,783
FLUID PRESSURE ACTUATED METERING DEVICE
Filed June 19, 1961
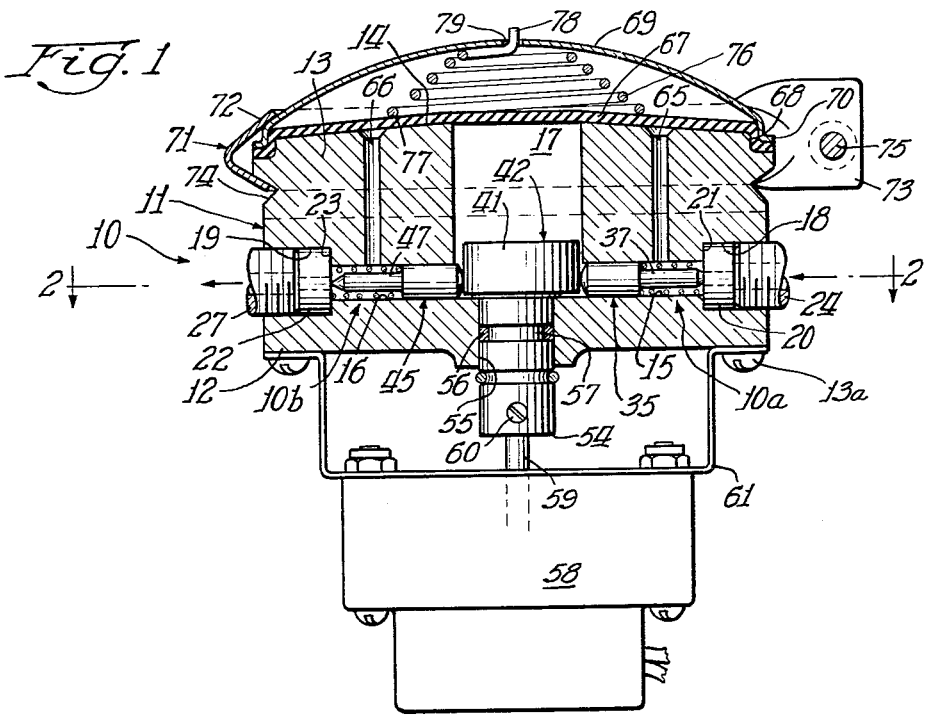
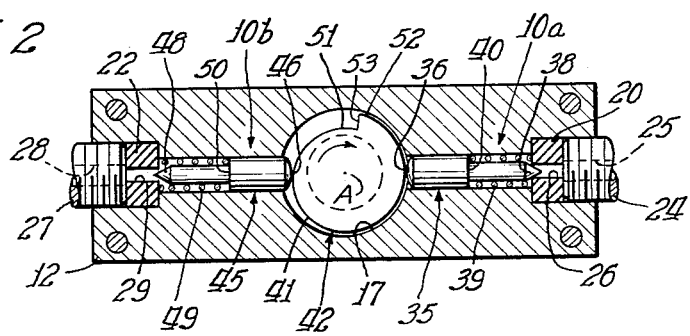
Inventors:
LYLE F. SHAW
CLYDE F. BAKER
ROMEO V. BOUGIE
By: H. J. Schmid Atty.

United States Patent Office 3,151,783
Patented Oct. 6, 1964

3,151,783
FLUID PRESSURE ACTUATED METERING DEVICE
Lyle F. Shaw, Muskegon, Clyde F. Baker, Muskegon Heights, and Romeo V. Bougie, Baldwin, Mich., assignors to Borg-Warner Corporation, Chicago, Ill., a corporation of Illinois
Filed June 19, 1961, Ser. No. 117,936
2 Claims. (Cl. 222—335)

This application relates to a device and more particularly to a metering device for providing a measured quantity of fluid from a given fluid source.

In the operation of certain apparatus such as automatic ice cube making machines, it is highly desirable to be able to utilize a typical water supply, such as tap water, to provide a predetermined measured quantity of water under conditions of substantially constant pressure and quantity flow regardless of the pressure of the source. The typical sources of water utilized in homes and commercial buildings do not have a constant pressure or flow rate and in most instances the pressure thereof is too great to be directly utilized by an apparatus such as an ice cube making machine. It is, therefore, extremely important to be able to provide a device which is capable of utilizing a variable high pressure water, normally supplied by the typical water system, to provide a measured quantity flow of water at a predetermined pressure.

It is the object of this invention to provide a valve of relatively simple and economical construction for utilizing the typical water supply source to provide a measured quantity of water at a lower pressure.

With these and other objects in view, the present invention contemplates a metering device including, among other things, an inlet valve structure, and an outlet valve structure which are interconnected by a resiliently expandible chamber and wherein the inlet valve is connected to a pressurized fluid source. The inlet and outlet valves are alternately actuated for first allowing the fluid to flow through the inlet valve and into the chamber against a reaction force exerted by the resiliently expandible chamber, and then for allowing fluid to flow out of the chamber and through the outlet valve under the influence of reaction force created by the resiliently expandible chamber.

Other objects, advantages, and novel aspects of the invention will become apparent upon the following detailed description in conjunction with the accompanying drawings wherein:

FIG. 1 is a partially sectioned view through the metering valve showing the interrelationship of the inlet valve, resiliently expandible diaphragm and the outlet valve;

FIG. 2 is a sectional view taken along line 2—2 of FIG. 1 showing the interrelationship of the inlet valve, the outlet valve, and the valve actuating cam.

Referring to the drawings, there is illustrated a metering device, generally designated by the numeral 10, which includes an inlet valve structure 10a and an outlet valve structure 10b. The metering device also includes a two-piece body 11 (FIGS. 1 and 2) having a rectangular lower portion 12 (FIG. 2) and a circular upper portion 13 which has an arcuate upper surface 14 (FIG. 1). The upper and lower body portions 13 and 12 are held together by screws 13a. A cylindrical inlet passage 15 and coaxial cylindrical outlet passage 16 are provided in the lower body portion 12 and open inwardly into a bore 17. The inlet passage 15 opens outwardly into an inlet chamber 18 and the outlet passage 16 opens outwardly into an outlet chamber 19.

An inlet washer 20, made of rubber or other resilient material, is positioned against an annular inlet shoulder 21 in the inlet chamber 18. Similarly, an outlet washer 22 is positioned against an annular outlet shoulder 23 in the outlet chamber 19. A supply conduit 24 is threadably secured in the inlet chamber 18 and is adapted to supply water, or similar fluid, through a passage 25 therein and through a passage 26 in the washer to provide pressurized fluid in the inlet passage. Similarly, an exhaust conduit 27 is threadably secured in the outlet chamber 19 and is adapted to allow water or similar fluid, to flow through a passage 28 therein and through a passage 29 in the washer 22 to provide a fluid outlet.

The inlet valve, generally designated by the numeral 10a includes a cylindrical inlet plunger 35 which is slidably mounted in the inlet passage 15. The inlet plunger 35 is provided with a cam-following surface 36 on the inner end thereof and a reduced portion 37 on the outer end thereof. The reduced portion 37 is provided with a conical end surface 38 adapted for engaging the washer 20 adjacent the passage 26 to seal the passage 26 and prevent flow therethrough. A compression spring 39 is provided within the inlet passage 15 surrounding the reduced portion 37 of the inlet plunger 35. The spring 39 is secured against outward motion by the washer 20 and is adapted for engaging a shoulder 40 on the inlet plunger to urge the inlet plunger inwardly in the inlet passage 15 so as to cause the cam-following surface 36 to be in following engagement with a cam surface 41 of a cam 42.

The exhaust or outlet valve generally desingated by the numeral 10b includes, among other things, a cylindrical outlet plunger 45 which is slidably mounted in the outlet passage 16. The outlet plunger 45 is provided with a cam-following surface 46 on the inner end thereof and a reduced portion 47 on the outer end thereof. The reduced portion 47 is provided with a conical end surface 48 which is adapted for engaging the washer 22 adjacent to the passage 29 thereof to seal the passage 29 and prevent flow therethrough. A compression spring 49 is provided within the outlet passage 16 adjacent the reduced portion 47 of the outlet plunger 45. The spring 49 is held against outward motion by the washer 22 and is adapted for engaging an annular shoulder 50 of the outlet plunger 45 to urge the outlet plunger inwardly in the outlet passage 16 so as to cause the cam-following surface 46 to be in following engagement with the cam surface 41.

As seen in FIG. 2, the cam surface 41 gradually decreases in radius about the rotational axis A of the cam from a radially outermost point 52 to a radially innermost point 51, a shoulder 53 defining and separating these points on the cam surface. The cam 42 is provided with a reduced cylindrical hub 54 which is rotatably mounted in a bore 55 in the lower body portion 12 and is sealed by a sealing ring 56 retained in a groove 57 in the hub 54. The cam 42 is driven by a motor 58 having a drive shaft 59 which is drivingly secured to the hub 54 of the cam by a set screw 60. The motor 58 is secured to a bracket 61 which, in turn, is secured to the lower body portion 12 by screws 13a.

An inlet port 65 and an outlet port 66 are provided in the valve body 11 and are adapted to interconnect the inlet passage 15 and the outlet passage 16 respectively with the upper arcuate surface 14 of the upper body portion 13. A diaphragm 67, made of rubber or other similar resilient material, is positioned over the arcuate surface 14 and has its peripheral edge engaging an annular groove 68 in the periphery of the upper valve body portion 13. A retaining cap 69 is positioned over the diaphragm 67 and is provided with a flange 70 adapted to engage the peripheral edge of the diaphragm and to enter the groove 68 in the upper body portion 13.

The cap 69 and the diaphragm 67 are secured to the upper body portion 13 by a clamp 71 which includes an annular V-shaped open ring 72 terminating in adjacent radial flanges 73. The upper periphery of the ring 72 is adapted to engage the retaining cap 69 and the lower periphery of the ring 72 is adapted to enter an annular groove 74 in the periphery of the upper body portion 13. A screw 75 is passed through one flange 73 and is threaded into the other flange 73. The screw 75 is thereby adapted for drawing the flanges 73 together when tightened, so as to constrict the ring 72 and thereby force the ring 72 into contact with the upper body portion 13 and the cap 69 so as to secure diaphragm 67 on the upper body portion 13. Thus, the diaphragm 67 is held in position on the arcuate surface 14 of the upper body portion 13 and effectively seals an expansible and contractable fluid chamber defined by the diaphragm 67 and upper body portion 13.

The diaphragm 67 will usually be sufficient to provide the appropriate resiliency for the fluid chamber adjacent the upper surface 14. However, when higher pressure fluid is to be metered, it may be desirable to utilize a compression coil spring 76 to supplement the resilient force exerted by the resilient diaphragm 76. The compression coil spring 76 may be positioned between the diaphragm 67 and the retaining cap 69. A lower portion 77 of the spring 76 is in engagement with the diaphragm 67 and an upper end portion 78 is anchored in an opening 79 in the cap 69. The compression spring 76 is thereby in a position to be effective for urging the diaphragm 67 downwardly against the arcuate surface 14 of the upper body portion 13 to aid in the contraction of the fluid chamber, as shown in FIG. 1. It should be noted that the fluid chamber between the arcuate surface 14 and the diaphragm 67 can be expanded by deforming the diaphragm 67 upwardly to compress the spring 76.

*Operation*

In the operation of the metering device 10, the motor 58 is actuated to rotate the cam 42 at a predetermined speed in a clockwise direction (FIG. 2). It should be noted that the springs 39 and 49 will urge the plungers 35 and 45 respectively, into engagement with the cam surface 41 of the cam 42. As a consequence, when the high point 52 of the cam surface 41 is in engagement with the inlet plunger 35 (FIG. 2), the conical surface 38 of the inlet plunger 35 will enter the passage 26 of the washer 20 and seal the passage 26 against fluid flow from the inlet conduit.

As the cam 42 continues to rotate in the clockwise direction, the inlet plunger 35 will eventually leave the high cam point 52 at the shoulder 53 and move to the left to engage the low cam point 51. As a consequence, the conical surface 38 of the inlet plunger 35 will be removed from the washer passage 26. The pressurized fluid in the inlet conduit passage 25 will flow through the washer passage 26, into the inlet passage 15, through the inlet port 65 and into the chamber formed by the upper surface 14 of the upper body portion 13 and the resilient diaphragm 67 to expand the chamber.

The fluid will flow into the defined chamber, against the resistance of the resilient diaphragm 67 and compression spring 76, for a predetermined time determined by the speed of the cam 42. During the flow of fluid into the metering device 10, the outlet plunger 45 is urged to the left (FIGS. 1 and 2) by the high point 52 of the cam 42 so that the conical surface 48 is forced into the washer passage 29 to seal the washer passage against outward flow of the fluid. Thus, a predetermined amount of fluid will be trapped between the upper body surface 14 and the diaphragm 67 under a pressure determined by the deformation resistance of the resilient diaphragm 67 and the compression spring 76.

The fluid is released from the metering device 10 as the cam 42 continues to rotate in a clockwise direction (FIGS. 1 and 2) from a position where the inlet plunger 35 is in engagement with the lower point 51 of the cam 42, to a position where the plunger 35 is in engagement with the high point 52. When the plunger 35 is in engagement with the high point 52, the conical surface 38 will be forced into the washer passage 26 and thereby seal the washer 20 against flow of the pressurized fluid.

Simultaneously with the sealing of the washer passage 26, the low point 51 of the cam 52 will engage the outlet plunger 45 so that the outlet plunger will be urged to the right and the conical surface 48 will be removed from the washer passage 29. The fluid trapped between the diaphragm 67 and the upper surface 14, which is under the resistant force exerted by the resilient diaphragm 67 and the compression spring 76, will thereupon be forced by the diaphragm 67 and the compression 76 through the outlet port 66, into the outlet passage 16, and through the washer and exhaust conduit passages 29 and 28, respectively. It should be noted that the fluid is exhausted from the metering device under a pressure created only by the force provided by the deformed diaphragm 67 and compression spring 76, and is wholly independent of the original pressure of the fluid in the inlet conduit passage 25.

Thus, as the cam 42 is rotated in a constant speed by the motor 58, the inlet and outlet plungers 35 and 45 will be simultaneously reciprocated by the cam 42 to alternately close the normally closed inlet and the outlet passages 26 and 28. As a result, fluid flows through the inlet passage into the chamber, formed by the upper surface 14 and the diaphragm 67 against the resistance of the resilient diaphragm 67 and the compression spring 76. Subsequently, the cam 42 moves the inlet and outlet plungers 35 and 45 to the right to open the outlet passage 29 and to close the inlet passage 26 so as to allow the fluid to be forced out through the outlet passage 29 under the influence of the pressure created solely by the deformed diaphragm 67 and the compression spring 76. This pressure is less than the original pressure of the fluid supplied to the inlet passage 26 and is determined by the deformation resistance offered by the diaphragm 67 and compressing the spring 76 and is completely independent of the fluid pressure of the fluid source.

We claim:

1. A metering device utilizing a pressurized fluid source comprising a valve body having aligned inlet and outlet passages and inlet and outlet ports angularly disposed relative to said passages, said body having an arcuate surface; a resilient diaphragm secured to said body and snugly engaging said arcuate surface and expandible therefrom to provide a chamber between said surface and said diaphragm, said inlet port having one end terminating at said surface and its other end terminating in said inlet passage for fluid communication between said inlet passage and said chamber, said exhaust port having one end terminating at said surface and its other end terminating in said exhaust passage for fluid communication between said chamber and said exhaust passage; an inlet valve in said inlet passage and connecting said inlet port and thereby said chamber with said inlet passage, upon opening of said inlet valve, to allow fluid from said source to enter said chamber and to exert force by the pressure of the fluid on said resilient diaphragm to flex and expand said diaphragm to disengage said surface, and to provide said chamber; an exhaust valve in said outlet passage and connecting said outlet port to said outlet passage, upon opening of said exhaust valve, for exhausting fluid from said chamber; and actuating means disposed between said inlet and outlet valves for alternately actuating said inlet and outlet valves for allowing pressurized fluid to enter said inlet port to expand said diaphragm and thereby said chamber during the open position of said inlet valve and the closed position of said outlet valve and, for exhausting fluid from said chamber through said exhaust port and said exhaust valve, by contracting movement of said diaphragm, in the open position of said exhaust valve and closed position of said inlet valve.

2. A metering device utilizing a pressurized fluid source comprising a valve body having an inlet passage for fluid from said source, an inlet port in fluid communication with said inlet passage, an exhaust passage for flow of fluid from said valve body, and an exhaust port in fluid communication with said exhaust passage; a resilient deformable diaphragm secured to said body defining a mechanically-expandible and self-contracting chamber between said body and said diaphragm, said ports being in fluid communication with said chamber and each having one end thereof terminating in said chamber and closed by said diaphragm in the contracted condition of said diaphragm; an inlet valve in said inlet passage and, in the open position thereof, connecting said inlet passage and inlet port to said chamber for allowing fluid from said source to pass through said inlet port and to exert force by the pressure of said fluid on said resilient diaphragm to flex and expand said diaphragm, against the self-contracting resiliency of said diaphragm, to uncover said ports for flow of fluid from said inlet port into said chamber and therefrom into said exhaust port; an exhaust valve in said exhaust passage and having an open position for flow of fluid from said chamber and through said exhaust port and into said exhaust passage; a rotatable cam for alternately actuating said inlet and said outlet valves for allowing the pressurized fluid to flow from said inlet passage to said inlet port and to enter said chamber to expand said diaphragm during the open position of said inlet valve and the closed position of said outlet valve and for exhausting fluid from said chamber through said exhaust valve, by the self-contraction of said diaphragm, in the open position of said exhaust valve and closed position of said inlet valve; and means for rotating said cam.

References Cited in the file of this patent
UNITED STATES PATENTS

| | | |
|---|---|---|
| 1,326,247 | Zengel | Dec. 30, 1919 |
| 2,585,172 | Reynolds | Feb. 12, 1952 |
| 2,675,946 | Strempel | Apr. 20, 1954 |
| 2,811,286 | Bauerlein | Oct. 29, 1957 |
| 2,830,743 | Rimsha et al. | Apr. 15, 1958 |
| 2,888,174 | Bauerlein | May 26, 1959 |